United States Patent [19]

Fogelberg

[11] 4,391,859

[45] Jul. 5, 1983

[54] PROCESS AND A COMPOSITION FOR THE INSULATION OF SURFACES, AND PRODUCT HEREBY OBTAINED

[75] Inventor: Ernst R. Fogelberg, Vällingby, Sweden

[73] Assignee: AB Bonnierföretagen, Stockholm, Sweden

[21] Appl. No.: 332,679

[22] Filed: Dec. 21, 1981

Related U.S. Application Data

[63] Continuation of Ser. No. 242,688, Mar. 11, 1981, which is a continuation of Ser. No. 800,200, May 25, 1977, which is a continuation of Ser. No. 593,661, Jul. 7, 1975, abandoned.

[30] Foreign Application Priority Data

Jul. 10, 1974 [SE]   Sweden ............................... 7409097

[51] Int. Cl.³ ........................ B05D 1/02; B05D 1/12
[52] U.S. Cl. ..................................... 427/421; 252/62; 252/404; 252/963; 252/964; 428/446
[58] Field of Search .................. 252/62, 404, 408; 427/204, 403, 421, 426; 428/446

[56] References Cited

U.S. PATENT DOCUMENTS

| | | | |
|---|---|---|---|
| 2,683,625 | 7/1954 | Fisher | 427/426 |
| 2,804,437 | 8/1957 | Katz et al. | 260/19 |
| 3,244,632 | 4/1966 | Schulz | 252/62 |
| 3,676,197 | 7/1972 | Harrison | 427/426 |

*Primary Examiner*—Shrive P. Beck
*Attorney, Agent, or Firm*—Gordon W. Hueschen

[57] ABSTRACT

The invention relates to a process for insulating surfaces for the purpose of preventing or reducing occurrence of condensation on the surface, comprising applying to the surface a layer of a coating composition containing a binder and, distributed therein, granules of an expanded inorganic material having a bulk density of at least 150 kgs/m³. The invention also provides for a composition suitable for carrying out such process, comprising a binder and granules of an expanded inorganic material of the nature indicated.

8 Claims, 1 Drawing Figure

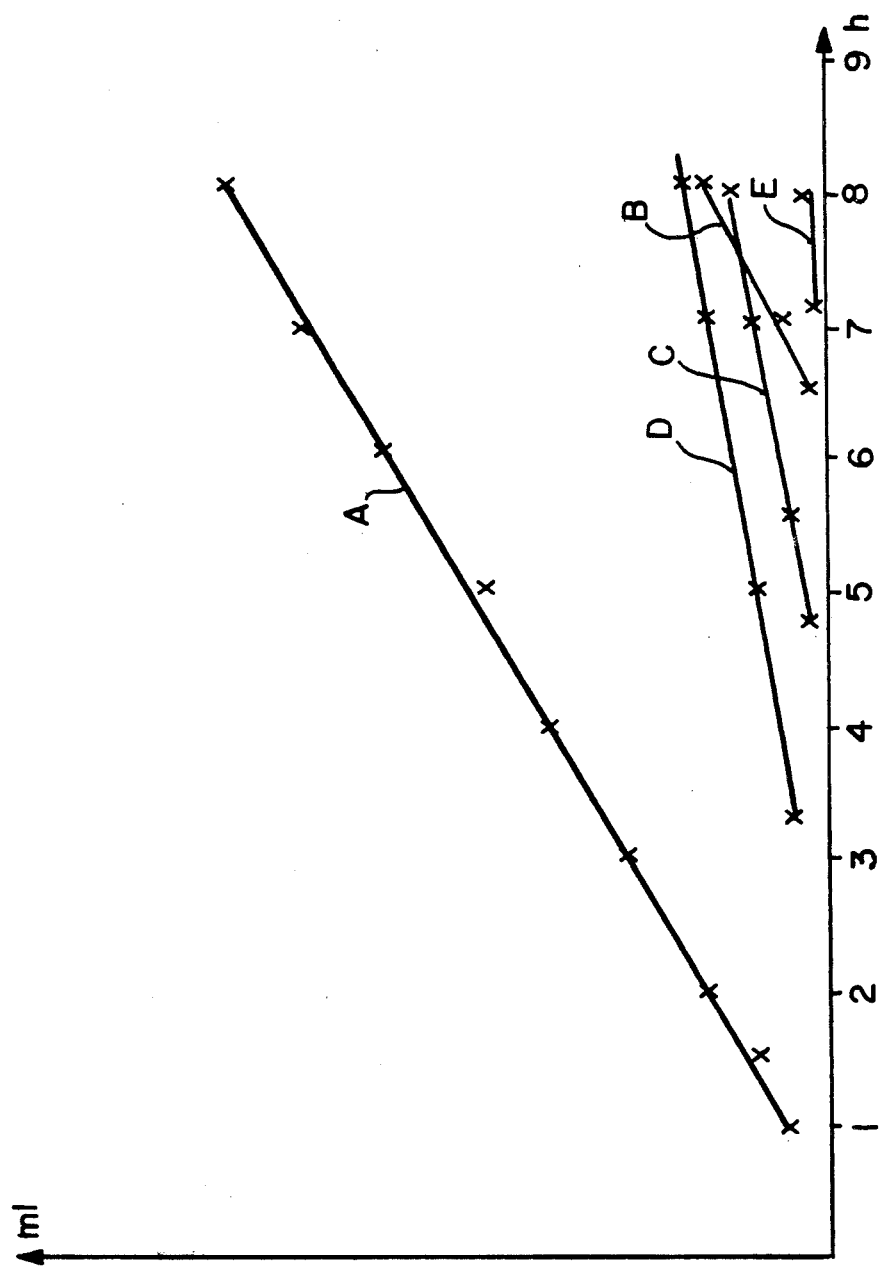

PROCESS AND A COMPOSITION FOR THE INSULATION OF SURFACES, AND PRODUCT HEREBY OBTAINED

This is a continuation of application Ser. No. 242,688, filed Mar. 11, 1981, which is a continuation of application Ser. No. 800,200, filed May 25, 1977, which is a continuation of application Ser. No. 593,661, filed July 7, 1975, now abandoned.

BRIEF SUMMARY OF THE INVENTION

The present invention relates to a process and a composition for the insulation of surfaces, preferably uninsulated surfaces, for the purpose of preventing or reducing the formation of condensate on the surface.

A long-standing problem has been the formation of condensates on the interior surface of uninsulated roofs and walls usually found in high-volume buildings, such as storage spaces, hangers, halls of different kinds etc. Many attempts have been made to solve this difficult problem manifesting itself in the formation of condensate to such an extent that run off by dropping or coherent flow will result. The problem is multi-faceted, since the solution of the problem by application of different forms of insulating materials in turn results in phenomena in the form of problems of the supporting ability of the construction, corrosion between support and insulation, increase in constructional costs etc. Moreover, it is desirable on the one hand to apply the insulation in connection with the manufacture of the building material in question and on the other hand to apply the insulation on existing constructions in a simple manner without need for disassembling the construction.

In an attempt to solve the problem of the formation of condensate, compositions have been prepared including binder and so-called diatomite, i.e. the naturally occurring material kieselguhr, and some advantageous effects have been obtained but the problem has not up to now received a satisfactory solution. Among the disadvantages connected with these prior art compositions it can be mentioned that they require relatively high contents of inorganic materials, that in view of the formation of cracks the composition must contain a fibre material, and that the drying does not proceed in a satisfactory way, especially at high layer thickness.

One purpose of the present invention is to provide a process and a composition for insulating uninsulated surfaces for the purpose of preventing or reducing occurrence of condensation on the surfaces while at the same time avoiding the disadvantages associated with the prior art.

In connection with the present invention it has surprisingly shown that this purpose can be obtained by applying to the surface to be insulated a layer of a coating composition including binder, optionally together with solvent, and granules of an expanded, inorganic material distributed therein. The expression "binder, optionally together with solvent" refers to an inherently liquid binder or a binder dissolved or dispersed in a liquid phase.

The problem of crack formation associated with the prior art having for a result that hitherto it has been necessary to include in the compositions applied some form of fibre material, for instance asbestos, is satisfactorily solved by this invention. Thus, it is found that the use of an expanded, inorganic material in conformity with the technique of this invention gives the result that the fibre material of the prior art can be completely excluded without the material showing tendency to crack-formation after application. While the invention is not to be bound to any particular theory it seems that the rough surface of the expanded inorganic material results in the necessary binding in the covering layer. The roughness also results in the advantage that the moisture absorption is improved in view of the enlargement of the surface resulting from the roughness of the granules.

The application according to the invention can be carried out either in connection with the preparation of the material to be made subject to insulation or can be carried out on existing building constructions.

Depending on the material to be insulated or coated, for instance metal sheet, inorganic materials, such as eternite, plastic materials or mortars, it may be advantageous for the binding of the insulating material to the substrate to apply a so-called primer to the surface before the application of the insulating material. The insulating material in the form of a coating composition is applied to the surface in question to a certain desired thickness, for instance 0.5–10 mm and preferably about 1–5 mm. The composition can be applied in any manner, for instance by coating, rolling or by spraying, and the latter procedure is preferred in connection with application of the composition on existing constructions.

The expanded inorganic material distributed in the composition in the form of granules can have a varying bulk density, and quite generally it is to prefer that the bulk density is less than about 150 kgs/m$^3$. A preferred range is 20–150 kgs/m$^3$ and the range 50–90 kgs/m$^3$ is particularly preferred. Different inorganic materials are conceivable, but a particularly preferred material is so-called perlite, which is a mineral existing in nature and consisting of liparite or quartz porphyry glass. This natural material of a volcanic origin contains confined water, and when the material is crushed and heat treated it expands heavily in view of the evaporization of the water and occupies a substantially enlarged volume.

By using an expanded inorganic material in granule form in conformity with the present invention, surprisingly good anti-condensation characteristics are obtained at relatively low contents of granulate. A preferred range is 5–20 percent by weight based on the composition before application, particularly 8–15 percent by weight and especially about 10 percent by weight. The granulate is preferably not too fine-grained, since it has been shown that relatively coarse granules impart particularly good absorption characteristics to the coating applied. A grain size of up to a few millimeters thus gives excellent results, and the range up to about 1.5 mm is particularly preferred. The lower limit with regard to the grain size is not critical but the fraction of fines should, of course, not be too high in view of the fact that this results in practical inconveniences in the form of dusting and the like. A practical lower limit with regard to grain size can be said to be about 0.01 mm.

The compositions of this invention contain suitably, in addition to liquid, dissolved or dispersed binder, and expanded granules distributed therein, a wetting agent by which the granules have been pretreated. This wetting agent treatment results in an improved moisture-absorbing ability of the final insulating coating. Wetting agent is supplied in relatively small amounts, suitably in an amount of from about 0.2–2 percent by weight based on the composition.

In addition to said constituents the composition may contain a pigment of the desired type, for instance a white pigment, such as $TiO_2$, or a coloured pigment, such as iron oxide red, iron oxide yellow, chromohydroxide green, phthalocyanine blue, phthalocyanine green, soot etc. in dependence on the colour desired. To fill up the cavities between the granules it is suitable to include in the composition also a so-called extender, which can consist of talcum, calcium carbonate, microdolomite, $SiO_2$ or kaolin. The amounts of extender and pigment are not critical and are adjusted in relation to the composition of the material. A suitable range of each is about 3–15 percent by weight based on the weight of the composition before its application. Any conventional binder of the art of paints can be used as a binder. The binder may, of course, be selected in accordance with the particular application, the desired fire-resistency etc., but the character of the binder is not critical for providing the desired effect of preventing formation of condensate. Among suitable binders there may be mentioned homo or copolymerisates dispersible or emulsifiable in water, for instance of the type polyvinyl acetate or polyvinyl acrylate. Moreover, homo- or co-polymerisates dissolved in a solvent may be mentioned. Furthermore, oxidatively drying binders, for instance vegetable oils, such as linseed oil, alkyd, etc.

Another type of binder is the curing type of binder, for instance two-component systems, such as epoxy binders.

When a particularly pronounced fire-resistancy is desirable inorganic binders can be used, for instance of the water glass type. When in this disclosure it is said that the composition includes binder and solvent it is meant that the composition may contain only binder and solvent included therein or binder together with further solvent.

The invention also covers the finally insulated product, i.e. substrate together with insulating coating.

BRIEF DESCRIPTION OF THE DRAWING

The drawing is a graph comparing coating compositions of the invention with coating compositions of the prior art.

In the following the invention will be further described by non-limiting examples. The parts and percentages are by weight unless otherwise stated.

EXAMPLE 1

A coating composition was prepared in the following manner:

Chloro caoutchouc (Alloprene ®R10, ICI, England) having a viscosity of 10 centipoises (10.5 parts by weight) together with chlorinated paraffin (Cerechlor ®42, ICI, England) as a plasticizer (6.0 parts by weight) is dissolved in xylene as a solvent (19.5 percent by weight). In the solution obtained $TiO_2$ is dispersed as pigment (5 parts by weight) together with talcum, 20 μm, as an extender (11.5 parts by weight). In parallel herewith there is prepared a mixture of xylene as a solvent (34.0 parts by weight), soya lecithin as a wetting agent (1.0 part by weight) and a granulate of perlite, bulk density 60–70 kgs/m³, (10 parts by weight).

The above components prepared separately are mixed to a coating composition, which can be applied by spraying with a spray gun. The coating composition was applied underneath to an uninsulated roof of iron sheet subjected to temperature variations within the range −10° to +20° C. on the outer side and −6° to +18° C. on the inside at a relative humidity varying between 60 and 95%. The composition was applied to a thickness of about 1.5 mm, and on the coated surfaces no condensation can be seen in the form of dropping from the roof, which normally constitutes a difficult problem in connection with roofs in an uninsulated state. The effect obtained by using the coating composition according to the invention is in principle based on two effects, namely the effect due to the insulating and water-absorbing characteristics of the layer. If at extreme conditions condensation occurs on the coating, the moisture is distributed in the surface layer without dropping occurring, and the moisture may pass over later on to the surrounding at a lower atmospheric humidity.

The granules (perlite) used in this example have the following approximate chemical composition:

| | | |
|---|---|---|
| Silica | $SiO_2$ | 71–75 percent by weight |
| Alumina | $Al_2O_3$ | 12.5–18 percent by weight |
| Potassium oxide | $K_2O$ | 4–5 percent by weight |
| Sodium oxide | $Na_2O$ | 2.9–4 percent by weight |
| Calcium oxide | $CaO$ | 0.5–2 percent by weight |
| Iron oxide | $Fe_2O_3$ | 0.5–1.5 percent by weight |
| Magnesia | $MgO$ | 0.1–0.5 percent by weight |
| Total chlorides maximum | | 0.2 percent by weight |

The particle size of the granules lies within the range 0–1.5 mm. Preferred weight ranges and preferred weight fraction for the constituents of the instant example are given in the table below.

| | Percent by weight | |
|---|---|---|
| | Range | Preferably about |
| Chloro caoutchouc | 15–40 | 30 |
| Chlorinated paraffine | 2–10 | 6 |
| Titanium dioxide | 3–15 | 5 |
| Talcum | 5–15 | 11.5 |
| Xylene | 20–40 | 34 |
| Soya lecithin | 0.5–2 | 1 |
| Granulate (Perlite) | 5–15 | 12.5 |

EXAMPLE 2

In this example a composition is prepared starting from two components in the same manner as in Example 1, the first component being prepared starting from the following constituents:

| | | |
|---|---|---|
| Water | 10.0 | percent by weight |
| Hydroxyethyl cellulose 2%-visc. adjust. (Nartosol ® HR, Hercules AB, Sweden) | 10.0 | " |
| $NH_4OH$ pH adjusted to pH 8 | | |
| Polyphosphate wetting/dispersing agent | 0.1 | " |
| Polyglycol ester emulsifier (Arkopal N-090, Hoechst AG, Germany West) | 0.5 | " |
| Antifoam agent (Antifoam Troy 999, Troy, USA) | 0.5 | " |
| Ethylene glycol | 3.0 | " |
| $TiO_2$ Pigment | 5.0 | " |
| Talcum - 20 μm | 8.0 | " |
| Vinyl-acrylic copolymer (Mowilith 5152-5, Hoechst AG, Germany West) 50% solids in $H_2O$ | 40.0 | " |

The second component is the same type of granulate as in Example 1 (12.0 parts by weight) in water (10.7 parts by weight) together with a polyphosphate (0.2 parts by weight) as a wetting and dispersing agent.

Said two components are intermixed to the formation of a coating composition which in accordance with Example 1 is applied with a spray gun on an uninsulated iron sheet used as a roof and primed. The same advantageous results as in Example 1 are obtained.

The pigment $TiO_2$ used in the above example may be replaced by coloured pigments as desired with regard to the colour of the coating, such as iron oxide red, iron oxide yellow, chromo hydroxide green, phthalocyanine blue, phthalocyanine green, soot etc.

By applying the technique of this invention essential advantages are obtained in connection with insulation of roof or wall constructions of current interest. Among these advantages the following may be mentioned:

The layer resulting from the coating composition gives an effective insulation and thus a significantly reduced formation of condensate.

Condensates formed in spite of this are distributed over a larger surface in view of the contents of granules of the material.

The layer results in a certain absorption of moisture, which further reduces the risk that dropping shall occur.

The composition can be applied in one step to form a relatively thick coating without any drying problems arising. The composition need not contain fibre material in order that cracking shall be avoided.

To further illustrate the advantages of the invention comparing tests have been made, which are presented in the table below:

TABLE

| Period of time | A | B | C | D | E | F | G |
|---|---|---|---|---|---|---|---|
| 10 min. | — | — | — | x | — | x | — |
| 15 min. | — | — | — | 1.0 | x | 1.5 | x |
| 30 min. | — | — | — | 2.5 | 2.5 | 2.5 | 2.0 |
| 45 min. | — | — | — | 3.0 | 4.0 | 3.5 | 3.0 |
| 1 hour | — | — | — | 5.0 | 7.0 | 7.5 | 6.0 |
| 2 hour | — | — | — | 14 | 15.0 | 16 | 15.0 |
| 3 hour | — | x | — | test completed | test completed | test completed | test completed |
| 4 hour | — | 2.5 | x | | | | |
| 5 hour | — | 7.5 | 1.0 | | | | |
| 6 hour | — | 15.0 | 5.5 | | | | |
| 7 hour | — | test completed | 12.0 | | | | |
| 8 hour | — | | test completed | 20.0 | | | |
| after completed testing the surface is completely dry | | | | | | | |

In the testing on condensation, the apparatus employed was as described in Misistry of Works specification D.D.F. B./111 and consisted of several identical copper canisters mounted on an iron framework. Each canister was in the form of a cylinder open at the top and closed at the bottom by a right-angled cone. The copper canisters were coated externally with the materials under test to give coatings of the thicknesses indicated below. The canisters were attached to the iron framework and then filled with ice and water. Under these conditions moisture was gradually deposited on the coating by condensation and commenced to drip from the bottom of the canisters. The drops were caught in measuring cylinders and the amount of water collected was noted periodically. The temperature difference in the tests was 22° C., i.e. the difference between +25° C. being the environmental temperature and +3° C. being temperature of the ice water used. The relative humidity was 60-65%.

In the table, X refers to the time of the first water drop run off, whereas the figures refer to the collected amount of water in ml. Moreover, the columns designated A, B . . . G refer to different applied materials. A is a coating composition according to Example 2 above, whereas B and C consist of known anti-condensation masses based onthe use of diatomite. All of these compositions are applied to a layer thickness of about 1.5 mm. D consists of a known glossy latex paint, E of a known dull oil paint and F of a known glossy lacquer paint applied to a layer thickness of 60 µm. G is a conventional reinforced primer applied to a thickness of about ½ mm.

In order to further show the advantageous characteristics of applying the composition of this invention, the composition according to Example 2 above was compared to the anti-condensation material described in Swedish patent specification No. 315,380. The same apparatus was employed as that used in the above presented comparing tests, and the results obtained are illustrated on the appended drawing. In the drawing, run-off water in milliliters is given as a function of the period of time from starting the tests. In the diagram, line A refers to a layer of a conventional iron oxide primer applied to a thickness of about ½ mm. Lines B, C and D refer to the material described in Swedish patent specification No. 315,380, i.e. glass fibre mats having a thickness of 20 mm, 1.0 mm and 0.5 mm, respectively. Finally, line E refers to a layer of the anti-condensation composition according to Ex. 2 above in accordance with the present invention.

It is clearly seen from the diagram that the composition of this invention is outstanding in that dripping starts later than when using the prior art materials, and also the run-off rate does not increase by increasing time but remains essentially constant.

What is claimed is:

1. A process for minimizing accumulation of moisture on a cold surface exposed to humidity conditions which tend to cause condensation on said surface, which comprises feeding to the nozzle of a spray head a premixed sprayable coating composition containing a binder dispersed in a liquid vehicle having distributed therein water-absorptive granules of heat-expanded perlite having a bulk density of about 60-70 $kgs/m^3$, said composition being characterized in that the water-absorptive character of said granules is not occluded, in that said binder is either soluble in or physically-dispersible in said liquid vehicle, and in that it dries to an adherent, water-absorptive, insulating coating, and spray-coating said surface for the purpose of minimizing the collection of condensation on said surface with a thin layer of said composition to form said adherent water-absorptive, insulating coating, said granules having a particle size of about 0.01 to about 1.5 mm, being pretreated with a wetting agent, and constituting from 5 to 20 percent by weight of the composition.

2. A process according to claim 1, in which the binder is dissolved in said liquid vehicle.

3. A process according to claim 1, in which the binder is not dissolved in said liquid vehicle, but physically-dispersed therein.

4. The process according to claim 3, in which the liquid vehicle is water and the binder is a vinyl-acrylic copolymer.

5. The process of claim 1, in which the binder is selected from the group consisting of polyvinyl acetate, polyvinyl acrylate, and chloro caoutchouc.

6. The process of claim 5, in which the binder is polyvinyl acrylate and the liquid vehicle is water.

7. A process of claim 1, in which the coating composition contains said granules in the range of about 5 to 20 percent by weight, and said binder in the range of about 3 to 15 percent by weight.

8. A process according to claim 1, characterized in that the coating composition is applied to the surface to a thickness of 0.5 to 5 mm.

* * * * *

UNITED STATES PATENT AND TRADEMARK OFFICE
CERTIFICATE OF CORRECTION

PATENT NO. : 4,391,859

DATED : July 5, 1983

INVENTOR(S) : Ernst R. Fogelberg

It is certified that error appears in the above—identified patent and that said Letters Patent is hereby corrected as shown below:

Title Page, [54], third line of title, "HEREBY" should read -- THEREBY --

Col. 1, line 3; "HEREBY" should read -- THEREBY --

Col. 5, line 60; "Misistry" should read -- Ministry --
Col. 6, line 8; insert the word -- the -- after "being"
Col. 6, line 16; "onthe" should read -- on the --

Signed and Sealed this

Thirteenth Day of December 1983

[SEAL]

Attest:

GERALD J. MOSSINGHOFF

Attesting Officer  Commissioner of Patents and Trademarks